United States Patent
Stojkovic et al.

(10) Patent No.: US 9,873,459 B2
(45) Date of Patent: Jan. 23, 2018

(54) INSTRUMENT PANEL SECONDARY SERVICE JOINT

(71) Applicant: FORD GLOBAL TECHNOLOGIES, LLC, Dearborn, MI (US)

(72) Inventors: Dragan B. Stojkovic, Taylor, MI (US); Sreenivas Kuchibhatla, Canton, MI (US); Matthew Hickey, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/863,841

(22) Filed: Sep. 24, 2015

(65) Prior Publication Data
US 2017/0088187 A1 Mar. 30, 2017

(51) Int. Cl.
*B62D 25/14* (2006.01)
*B62D 25/08* (2006.01)

(52) U.S. Cl.
CPC ........... *B62D 25/14* (2013.01); *B62D 25/081* (2013.01); *B62D 25/145* (2013.01)

(58) Field of Classification Search
CPC ..... B62D 25/14; B62D 25/145; B62D 25/081
USPC ........................................... 296/193.02, 192
See application file for complete search history.

(56) References Cited

U.S. PATENT DOCUMENTS

| | | |
|---|---|---|
| 3,797,605 A | 3/1974 | Letzel et al. |
| 4,493,146 A | 1/1985 | Cronin |
| 5,685,598 A | 11/1997 | Inoue et al. |
| 5,712,764 A | 1/1998 | Baker et al. |
| 6,132,154 A | 10/2000 | Easter |
| 6,502,888 B2 | 1/2003 | Inoue et al. |
| 7,810,874 B2 * | 10/2010 | Vican ................... B62D 25/147 296/193.02 |
| 2007/0262613 A1 * | 11/2007 | Meier .................. B62D 25/145 296/192 |

FOREIGN PATENT DOCUMENTS

| | | |
|---|---|---|
| CN | 201721341 U | 1/2011 |
| EP | 0141959 B1 | 4/1988 |
| JP | 10175568 * | 6/1998 |
| WO | 2001012458 A1 | 2/2001 |

OTHER PUBLICATIONS

English machine translation of CN201721341U.

* cited by examiner

*Primary Examiner* — Joseph D. Pape
(74) *Attorney, Agent, or Firm* — Vichit Chea; King & Schickli, PLLC

(57) ABSTRACT

A vehicle instrument panel attachment joint assembly includes a first bracket associated with a strut holding a portion of the instrument panel and a second bracket associated with a portion of the vehicle. The assembly is configured whereby the second bracket underlies the first bracket on attachment. One or fasteners pass first through one or more second bracket through-bores and next through one or more first bracket through-bores to attach the first and second brackets one to the other. The first bracket includes one or more associated cooperating fastener receivers aligned with the one or more first bracket through-bores.

6 Claims, 6 Drawing Sheets

INSTRUMENT PANEL SECONDARY SERVICE JOINT

TECHNICAL FIELD

This disclosure relates generally to vehicle instrument panel assemblies. In particular, the disclosure relates to strategies for assembling an instrument panel to a vehicle frame, and for bracket assemblies for accomplishing same.

BACKGROUND

A vehicle instrument panel is an important component of a vehicle assembly, carrying a variety of essential, useful, and/or desirable elements. For example, the typical instrument panel typically carries or holds such diverse elements as a steering column/wheel, an instrument cluster, an entertainment center, a glove box and/or other dash-mounted storage compartments, navigation systems, built-in cameras, associated electronic modules, and others.

The vehicle instrument panel also serves an important structural function. In particular, for a desirable passenger cabin occupant experience, a primary requirement is for the instrument panel to be as rigid as possible. A suitably rigid instrument panel ensures an acceptable level of noise, vibration, and harshness (NVH), acceptable crash safety performance, and acceptable climate control performance, among others.

Certainly, optimum rigidity could be achieved by making the instrument panel an integral component of the vehicle frame. However, the requirement for rigidity must be balanced against the need to service/maintain the various instrument panel components as needed. In accordance with the complexity of the instrument panel design, in certain situations the entire instrument panel may have to be removed to service a particular part or parts. Thus, typically an instrument panel is made removable to allow access to the components thereof for servicing/maintenance/replacement. This presents an engineering challenge in the design of instrument panels and associated components.

As an example, FIGS. 1A and 1B respectively show a top and a side view of a conventional instrument panel 100. During vehicle assembly, the instrument panel 100 is installed to the vehicle body structure and fastened to the vehicle cowl. As shown in the figures, an instrument panel 102 is typically secured to portions of a vehicle cowl and/or frame 104 by a "top down" or vertical attachment strategy at least at an instrument panel joint 106, such as by a bracket and fasteners of known design. While substantially effective for its intended purpose in a very simple instrument panel, consider the modern instrument panel including a number of tightly packaged components as described above. In such instrument panels, space is at a premium and a readily accessible instrument panel joint 106 may not be an option.

This is illustrated in FIG. 1C showing an electronic module 108 such as a module for a heads-up display (HUD) which for space and/or operability considerations is installed in a location preventing ready access to the instrument panel joint 106 (not visible in FIG. 3). After installation of the instrument panel 100 and HUD 108 (or other module), the vehicle windshield 110 is bonded in place to complete the assembly. In such designs, a repair or replacement strategy requiring removal of the instrument panel 100 would require first removing the vehicle windshield 110 and next the electronic module 108 to access the instrument panel joint 106. This is because in the assembled vehicle there is insufficient space between the windshield 110 and the instrument panel 100 substrate to allow removal of the module 108. Such procedures are time and labor-intensive, increasing associated repair costs. In turn, removal of multiple vehicle components such as the windshield 110 risks damage to such components which risks further increasing the cost of repairs/replacement.

Thus, a need is identified in the art for improvements to vehicle instrument panel attachment strategies, and to components used therefor.

SUMMARY

In accordance with the purposes and benefits described herein and to solve the above-summarized and other problems, in one aspect of the present disclosure a vehicle instrument panel attachment joint assembly is described, including a first bracket associated with a strut holding a portion of the instrument panel and a second bracket associated with a portion of the vehicle. The attachment joint assembly is configured whereby the second bracket underlies the first bracket on attachment. One or more fasteners are passed first through one or more second bracket through-bores and next through one or more first bracket through-bores to attach the first and second brackets one to the other.

In embodiments, the first bracket may be attached to or integral to the strut. In embodiments, a portion of the first bracket may be configured to nest within a portion of the second bracket. In embodiments, the first bracket includes one or more associated cooperating fastener receivers aligned with the one or more first bracket through-bores. In embodiments, the one or more fasteners are threaded service bolts, speed fasteners, or screws and the one or more fastener receivers are cooperating threaded nuts or speed nuts.

In another aspect, a vehicle instrument panel and cowl assembly is described including an instrument panel assembly and a cowl, the instrument panel assembly and cowl being attached to one another by a split bracket assembly. The split bracket assembly comprises the attachment joint described above, including a first bracket associated with a strut holding a portion of the instrument panel assembly and a second bracket associated with the cowl on a first end and underlying the first bracket on an opposed end.

In yet another aspect, a vehicle is described including a body defining at least a passenger compartment and a cowl and an instrument panel assembly disposed within the passenger compartment and adjacent to the cowl. The instrument panel assembly and cowl are attached to one another by the described split bracket assembly.

In the following description, there are shown and described embodiments of the disclosed instrument panel attachment joint. As it should be realized, the described systems and methods are capable of other, different embodiments and its several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed instrument panel attachment joint, and together with the description serve to explain certain principles thereof. In the drawings.

Reference will now be made in detail to embodiments of the disclosed instrument panel attachment joint, examples of which are illustrated in the accompanying drawing figures.

DETAILED DESCRIPTION

The disclosed instrument panel attachment joint solves the above-described and other problems by providing a secondary instrument panel attachment joint which can be disassembled for instrument panel removal and service without requiring vehicle windshield removal. At a high level, the described instrument panel attachment joint is a split attachment joint attaching a portion of the vehicle instrument panel support structure to a portion of the vehicle cowl structure. By the described instrument panel attachment joint, a "bottom up" attachment strategy is provided which improves ease of disassembly of the instrument panel and cowl. Advantageously, during vehicle assembly the instrument panel is assembled to the vehicle substantially as described above. However, by the described split attachment joint and associated attachment strategy, the instrument panel can be removed without regard to or removal of any componentry overlaying the instrument panel attachment joint, and without requiring vehicle windshield removal.

Figure 1A:
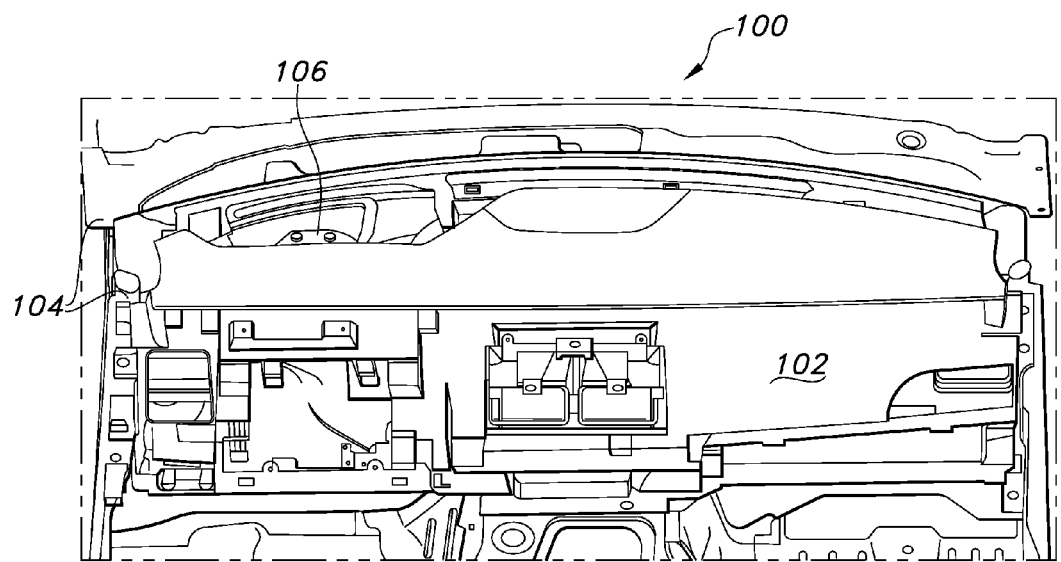
FIG. 1A depicts a top view of a prior art instrument panel to vehicle cowl assembly.
Figure 1B:
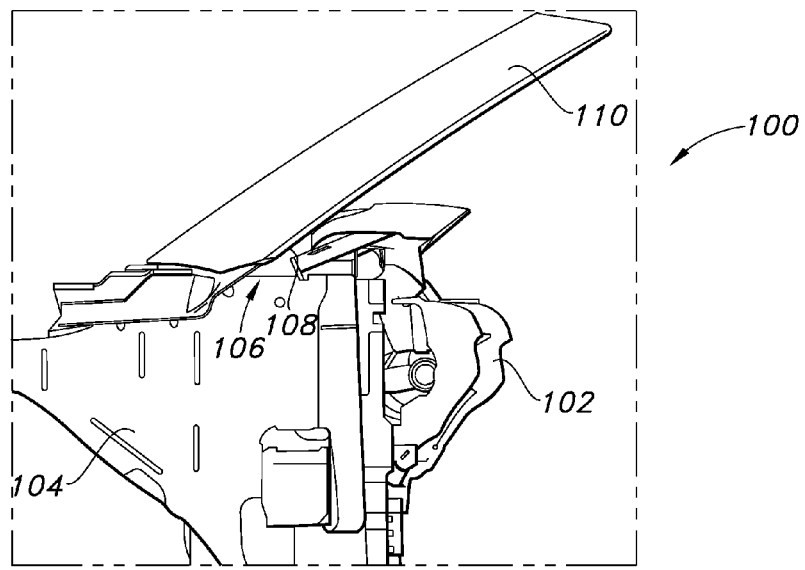
FIG. 1B depicts a side view of the assembly of FIG. 1A.
Figure 1C:
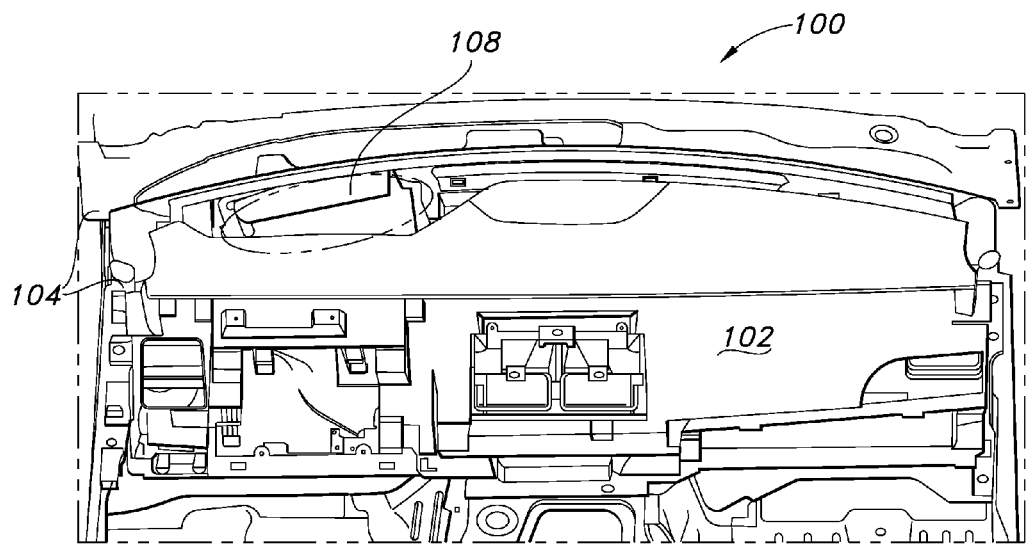
FIG. 1C depicts a top view of a prior art instrument panel to vehicle cowl assembly including an electronic module overlaying an attachment joint between the instrument panel and the vehicle cowl.
Figure 2:
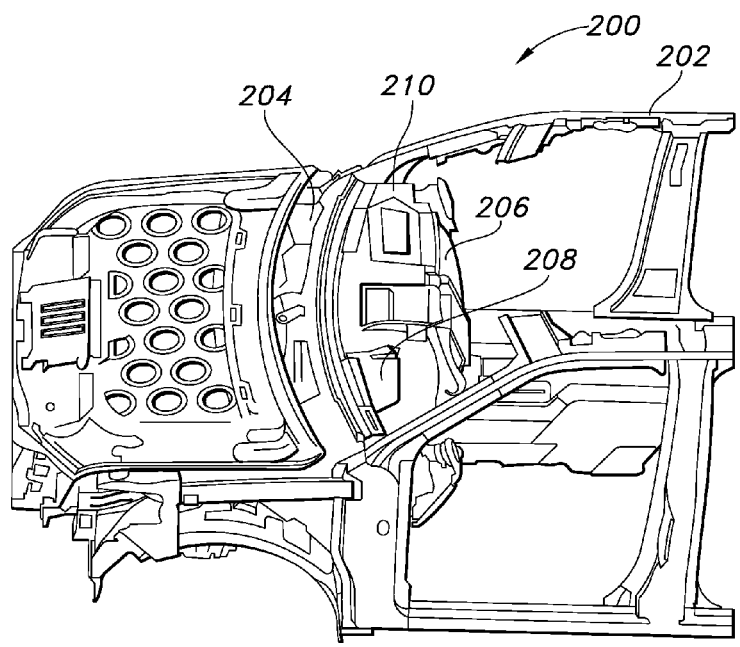
FIG. 2 depicts a vehicle including an instrument panel to vehicle cowl assembly according to the present disclosure, including an electronic module overlaying an attachment joint between the instrument panel and the vehicle cowl.

With reference to FIG. 2, a portion of a vehicle 200 is depicted including a frame 202, a cowl structure 204, and an instrument panel 206 attached to the cowl structure 204. An electronic module 208 such as an advanced heads-up display (AHUD) module overlays a site of the instrument panel attachment joint (not visible in this view). As summarized above, in a conventional vehicle assembly using a "top down" attachment of the instrument panel 206 to the vehicle cowl 204, removal of the vehicle windshield 210 and then the electronic module 208 would be required to access the attachment joint for subsequent removal of the instrument panel 204.

Figure 3:
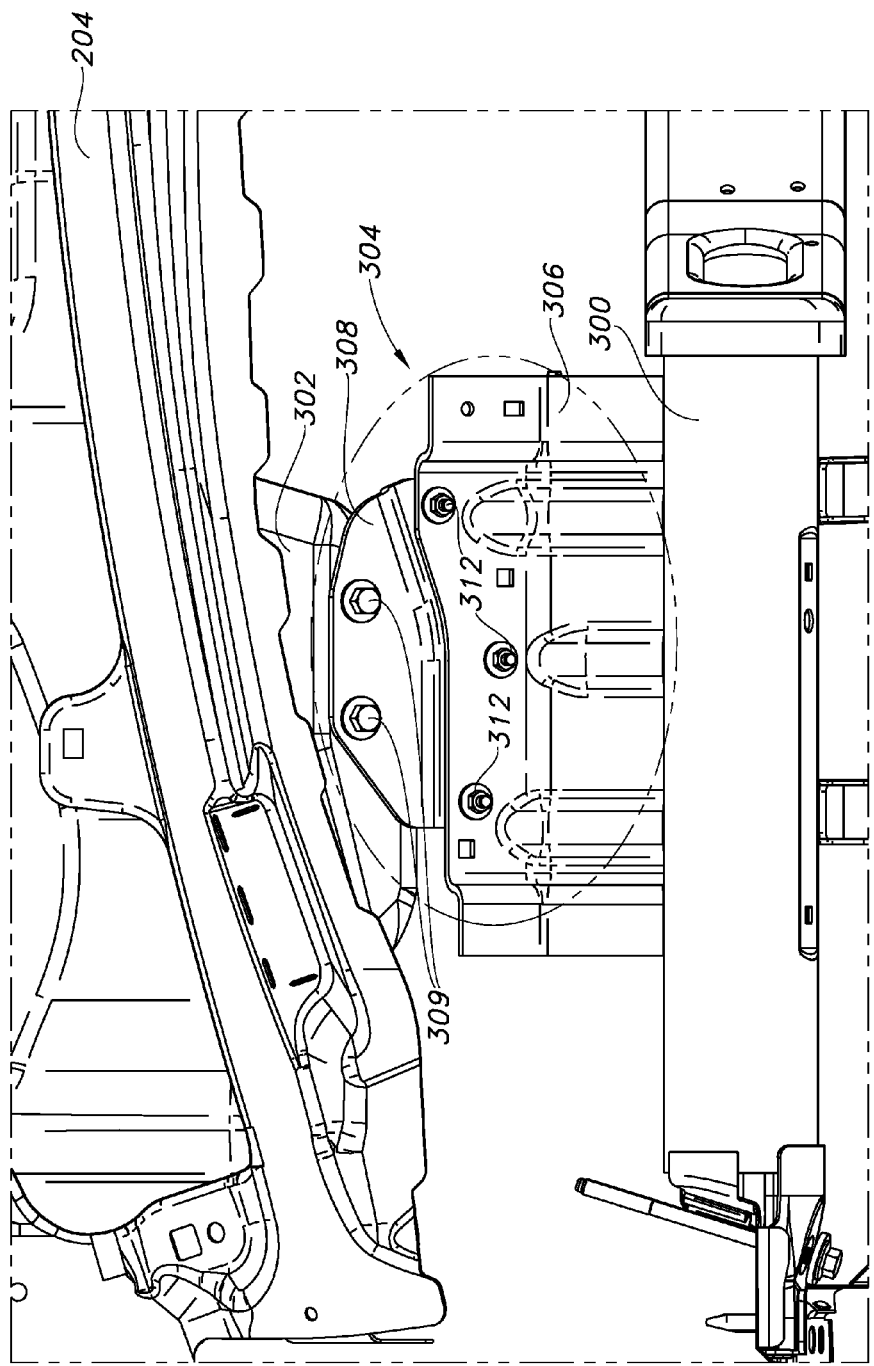
FIG. 3 depicts a top view of an attachment joint assembly according to the present disclosure.

With reference to FIG. 3, the present disclosure solves this problem by providing a split attachment bracket. As shown in the drawing figure providing a top view of the presently described bracket, the instrument panel (not shown in this view) is supported by a cross-vehicle strut 300 which is secured to the vehicle cowl 204, in the depicted embodiment to a cowl reinforcing bracket 302. This is accomplished by providing a split bracket assembly 304. In the depicted embodiment, the split bracket assembly 304 includes a cross-vehicle strut bracket 306 which is attached to a bridging bracket 308, which is in turn secured to the cowl reinforcing bracket 302. As shown, cross-vehicle strut bracket 306 includes a plurality of through-bores 310 (not visible in this view) including fasteners 312 associated therewith, such as by welding or other suitable fastening methods. Bridging bracket 308 likewise includes through-bores 310 (not visible in this view) to allow attachment to the cowl reinforcing bracket 302 such as by bolts 309 and cooperating nuts (not shown). As shown in the figure, the bridging bracket 308 is secured to the cowl reinforcing bracket 302 in a "top down" direction.

Figure 4:
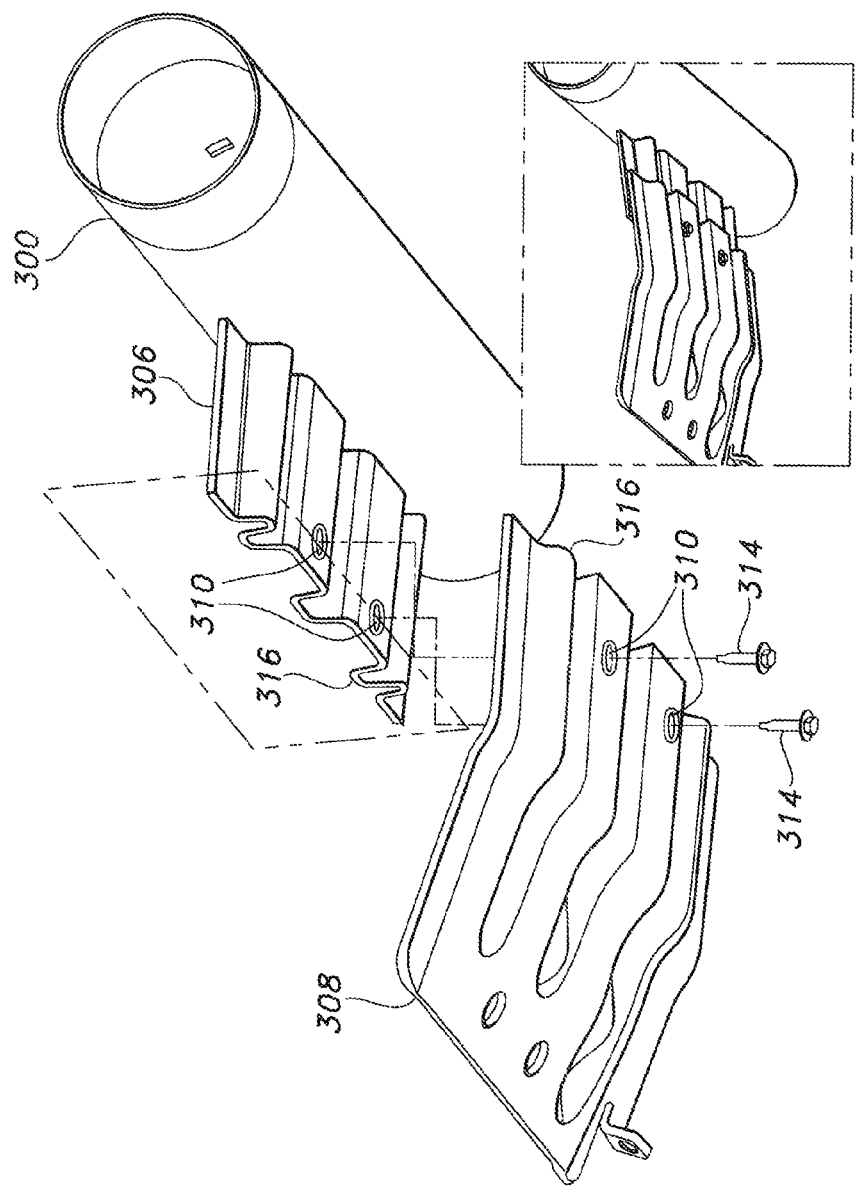
FIG. 4 depicts a bottom view of the attachment joint assembly of FIG. 3.

Turning to FIG. 4, as shown cross-vehicle strut bracket 306 is associated with the cross-vehicle strut 300. Cross-vehicle strut bracket 306 may be integrally formed with cross-vehicle strut 300 during fabrication, or may be attached thereto by suitable fastening means. As described above, apertures 310 include associated fasteners 312 (not visible in this view) for receiving and securing cooperating structures. In the depicted embodiment, fasteners 312 are nuts welded or otherwise secured to a top surface of the cross-vehicle strut bracket 306 and aligned with through-bores 310 for receiving cooperating bolts 314. Of course, the skilled artisan will readily appreciate that alternative fastener systems are suitable, including without intending any limitation screws, threaded speed nuts, and the like.

As depicted, each of cross-vehicle strut bracket 306 and bridging bracket 308 include mating ridges 316 formed therein to ensure a tight nesting fit therebetween. However, alternative structures/configurations for the brackets 306/308 are possible to provide the desired nesting fit, and are contemplated for use herein. During assembly, the cross-vehicle strut bracket 306 and the bridging bracket 308 are nested and secured one to another in a "bottom up" fashion as shown, with the bridging bracket 308 underlying the cross-vehicle strut bracket 306. It will be appreciated that the specific orientation of nuts 312 and bolts 314 could be reversed, i.e. with the bolts 314 secured to the cross-vehicle bracket 306 and passing through through-bores 310, while still preserving the desired "bottom up" fastening of the cross-vehicle strut bracket 306 to the bridging bracket 308.

Figure 5:
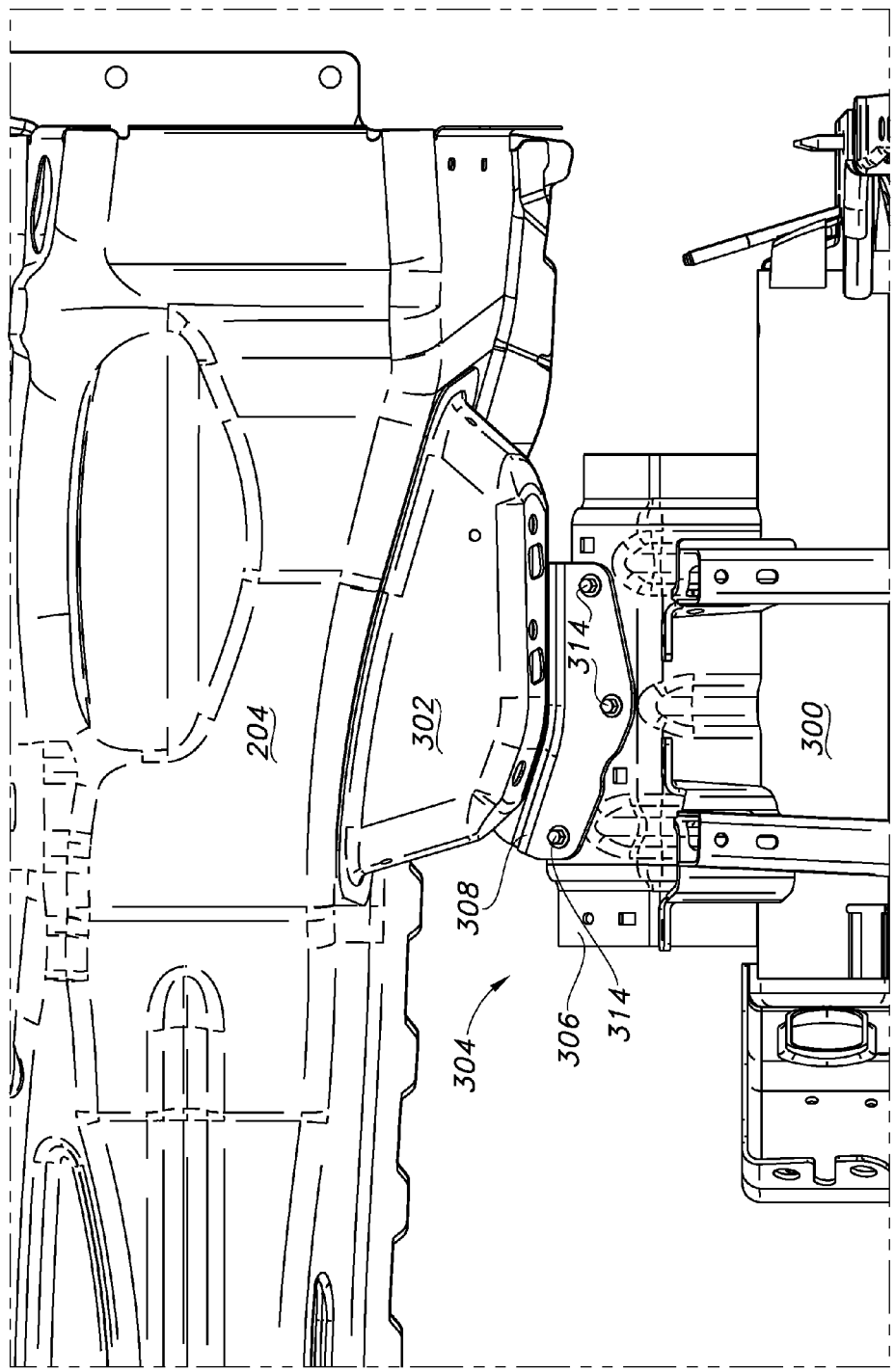
FIG. 5 depicts a bottom view of an instrument panel to vehicle cowl assembly including the attachment joint assembly of FIG. 3.
Figure 6:
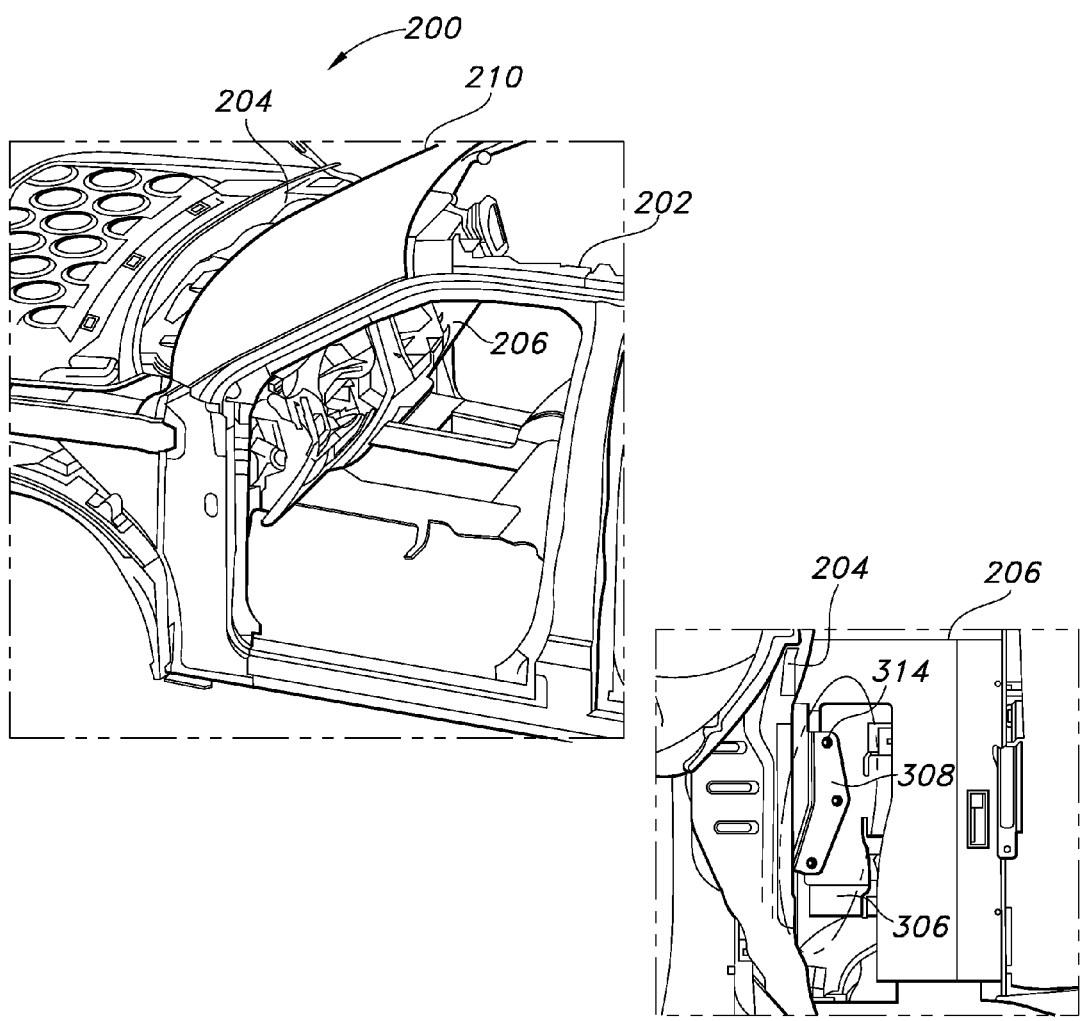
FIG. 6 depicts a vehicle including the instrument panel to vehicle cowl assembly of FIG. 5.

FIG. 5 shows a bottom view of the cross-vehicle strut 300 attached to the cowl reinforcing bracket 302 using the described split bracket assembly 304. As will be appreciated, ready access to fasteners 314 for removal is possible due to the described "bottom up" attachment of the cross-vehicle strut bracket 306 to the bridging bracket 308, simply by removing fasteners 314 and separating the cross-vehicle strut bracket 306 from the bridging bracket 308 to allow removal of the instrument panel. Thus, as shown in FIG. 6, the split bracket assembly 304 is easily accessible from underneath the instrument panel 206 (see arrow) for removal of the instrument panel to allow repair or replacement of components thereof.

As will be appreciated, by use of the described split bracket assembly 304, a number of advantages are realized. Efficiency and ease of instrument panel 206 component replacement/repair is increased, and required labor time is lessened. Concomitantly, repair costs are lessened. In turn, design flexibility for instrument panel design is increased, since the manufacturer need not account for instrument panel attachments joints in the implementation of new panel designs. Still more, by use of the described attachment joint, manufacturer safety, NVH, and durability requirements are met.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A vehicle instrument panel attachment joint assembly, comprising:
   a first bracket adapted for attaching to a strut holding a portion of an instrument panel; and
   a second bracket adapted for attaching to a portion of a vehicle cowl;
   wherein the second bracket underlies the first bracket in the attachment joint assembly, and wherein a portion of the first bracket is configured to nest within a portion of the second bracket.

2. The assembly of claim 1, further including one or more fasteners passing first through one or more through-bores defined in the second bracket and next through one or more through-bores defined in the first bracket to attach the first and second brackets one to the other.

3. The assembly of claim 2, wherein the first bracket includes one or more associated cooperating fastener receivers aligned with the one or more first bracket through-bores.

4. The assembly of claim 3, wherein the one or more fasteners are threaded service bolts, speed fasteners, or screws and the one or more fastener receivers are cooperating threaded nuts or speed nuts.

5. The assembly of claim 1, wherein the first bracket is integral to the strut.

6. A vehicle including the bracket assembly of claim 1.

\* \* \* \* \*